United States Patent [19]
Usui et al.

[11] Patent Number: 5,526,333
[45] Date of Patent: Jun. 11, 1996

[54] OPTICAL DISK RECORDING DEVICE

[75] Inventors: Akira Usui; Katsuichi Osakabe; Yukihisa Nakajo; Yoshihiko Shiozaki, all of Hamamatsu, Japan

[73] Assignee: Yamaha Corporation, Hamamatsu, Japan

[21] Appl. No.: 237,024

[22] Filed: May 3, 1994

[30] Foreign Application Priority Data

May 6, 1993 [JP] Japan .................................. 5-127745

[51] Int. Cl.⁶ ..................................... G11B 7/00
[52] U.S. Cl. ................. 369/50; 369/48; 369/59; 369/54
[58] Field of Search ................. 369/54, 47, 48, 369/49, 50, 53, 32, 124, 59

[56] References Cited

U.S. PATENT DOCUMENTS 5,216,657  6/1993  Nishiuchi et al. ................. 369/59 X
5,276,667  1/1994  Tsutsui et al. ................. 369/48 X

*Primary Examiner*—Georgia Y. Epps
*Assistant Examiner*—Muhammad N. Edun
*Attorney, Agent, or Firm*—Loeb & Loeb

[57] ABSTRACT

EFM input signal is received via an EFM input interface. Recording-timing adjustment data is received via a computer interface from a computer and stored in a register. To obtain EFM output signal having its pulse duration controlled on the basis of the EFM input signal and the record-timing adjustment data, there are further provided a clock signal generation circuit for generating clock signal by a phase-locked-loop arrangement based on a crystal oscillator, a first pair of counter and comparator driven by the clock signal to determine the pulse duration of a signal to be written, a second pair of counter and comparator that is driven by the clock signal and responsive to the output from the comparator of the first pair to start counting so as to determine a pulse duration to be adjusted, and a flip flop that is reset by the output from the comparator to provide an EFM output signal having a controlled pulse duration.

12 Claims, 2 Drawing Sheets

OPTICAL DISK RECORDING DEVICE

BACKGROUND OF THE INVENTION

The present invention relates to optical disk recording devices which perform digital recording onto an optical disk by irradiation of laser pulses.

To write data onto an optical disk such as a write-once optical disk (hereinafter referred to as a CD-WO), it is necessary to finely control the width, i.e., duration of each writing laser pulse to be applied onto the disk, with high resolution in the order of nanoseconds, in accordance with the selected writing speed, laser power, materials of the disk and pulse duration of signal to be actually recorded.

An approach to control the respective durations of the writing laser pulses is typically known which is characterized by selecting from among a set of delayed output value data that are previously prepared in correspondence to all laser pulse durations to be used for recording. As known in the art, the pulse durations of EFM (Eight to Fourteen Modulation) signals are limited to within a range from a minimum duration 3T (T is a basic unit time) corresponding to a minimum pit length, to a maximum duration 11T corresponding to a maximum pit length that is determined to allow stable clock extraction. Thus, with conventional programmable disk systems (PDSs), for instance, nine kinds of EFM output value data ranging from 3T to 11T are prepared in advance using a delay circuit so that selection may be made from among these data depending on each signal to be written. To this end, eight and nine switches are provided on the input and output sides of the delay circuit, respectively, and, the user has to manually operate these switches to adjust the respective delay times of individual delay elements of the delay circuit.

However, the above-mentioned prior approach to control the writing laser pulse durations has several drawbacks: (1) it requires many components and hence a large space, as well as bothersome adjustment of the switches; (2) thus resulting in high cost; (3) drift unavoidably occurs due to changes in ambient temperature, etc.; and (4) proper settings can not be accurately made for each selected writing speed (double speed, quadruple speed or the like).

SUMMARY OF THE INVENTION

It is therefore an object of the present invention to provide an optical disk recording device which is capable of controlling the durations of writing laser pulses without requiring many components, large space and bothersome adjustment under a minimized influence of temperature drift, and which also allows desired writing laser pulse durations to be set from outside.

In order to achieve the above-mentioned object, an optical disk recording device according to the present invention comprises a section for generating writing laser pulse, a signal input section for receiving a signal to be written onto an optical disk, a clock signal generation section employing a phase-locked-loop to generate clock signal having a relatively high frequency based on an oscillation frequency of a crystal oscillator, a pulse duration adjusting counter driven by the clock signal to count a time corresponding to the signal to be written, an adjustment data setting section for setting recording-timing adjustment data for each duration of the writing laser pulse, an adjustment data storage section for storing the recording-timing adjustment data set by the adjustment data setting section, a detection section for detecting when the recording-timing adjustment data set and a value counted by the pulse duration adjusting counter coincide with each other, and a signal output section for, at a timing when the detection section detects a coincidence between the recording-timing adjustment data and the value counted by the pulse duration adjusting counter, outputting a write signal for controlling the duration of the writing laser pulse, the write signal being obtained by adjusting a pulse duration of the signal to be written.

With such arrangements, the present invention can accurately control the writing laser pulse durations through entirely logical operations. Thus, by implementing the necessary logical components by integrated circuitry such as LSI (Large Scale Integrated Circuit) along with other signal processing circuitry, the invention can eliminate the need for many components and large space hitherto required in the prior art, thus achieving lower cost. In addition, by the use of the clock generation section employing a phase-locked-loop based on a crystal oscillator, drift due to ambient temperature change etc. can effectively be avoided, and yet adjustment of each writing pulse duration can be accurately made as desired via a computer such as a microcomputer. Further, by the use of the PLL of a high speed clock, the pulse duration of the laser pulse can be controlled.

Now, the preferred embodiment of the present invention will be described in detail below with reference to the accompanying drawings.

DETAILED DESCRIPTION OF THE PREFERRED EMBODIMENTS

Figure 1:
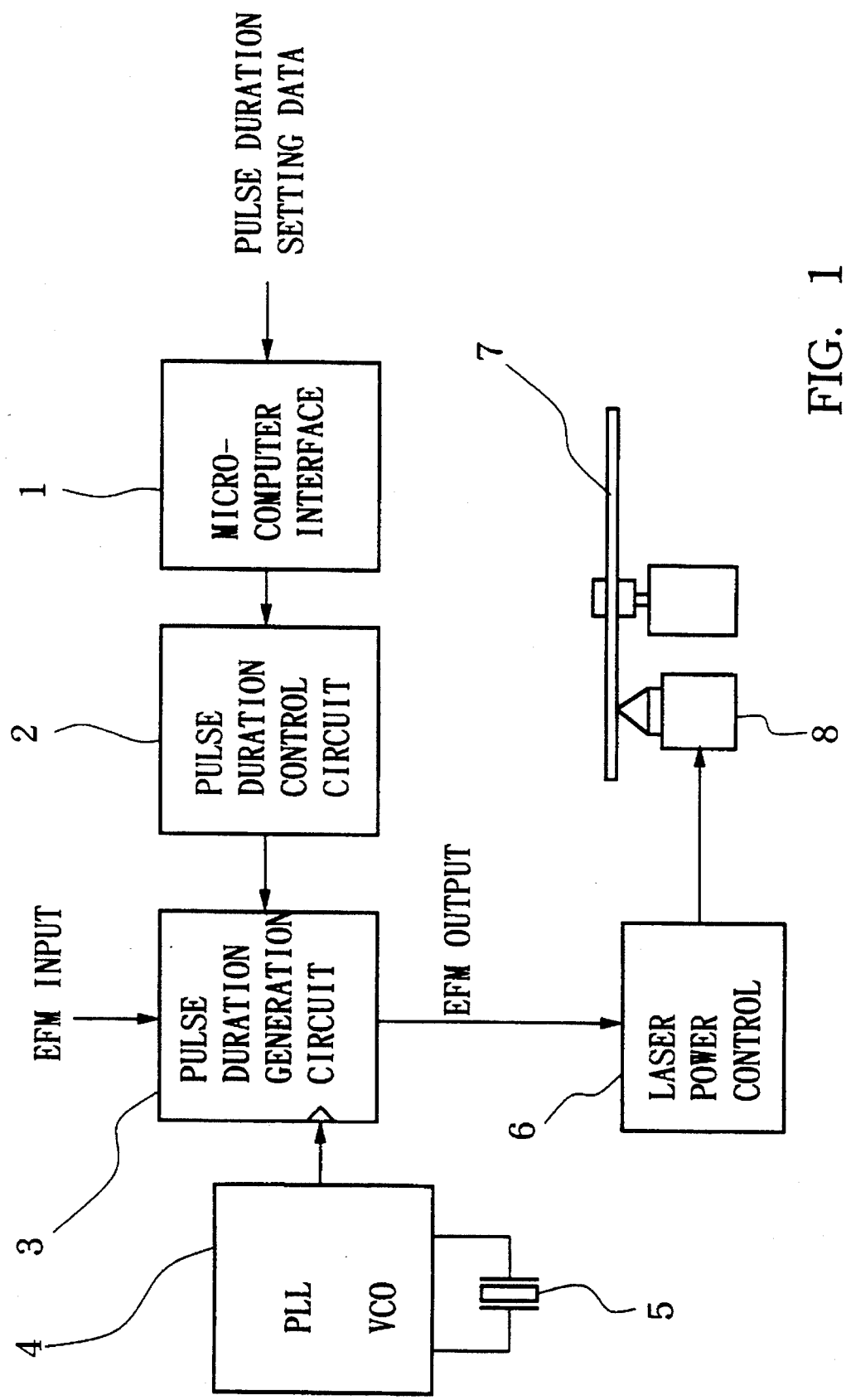
FIG. 1 is a block diagram showing the structural line of a CD-WO recording device in accordance with an embodiment of the present invention.

Referring first to FIG. 1, there is shown the structural outline of a CD-WO recording device in accordance with an embodiment of the present invention.

A microcomputer interface 1 receives, from a microcomputer, recording-timing adjustment data set for each writing pulse duration necessary for recording onto a CD-WO 7. A pulse duration control circuit 2 includes a storage section for storing the recording-timing adjustment data thus received from the microcomputer via the interface 1. EFM input signal representing data to be recorded is input to a pulse duration generation circuit 3, which in turn processes the signal so as to generate EFM output signal having been adjusted to a necessary pulse duration. In this embodiment, the above-mentioned components are all implemented by integrated circuitry, along with other signal processing circuit components.

As will be described in more detail later in relation to FIG. 2, the pulse duration generation circuit 3 comprises two pairs of counters and comparators driven by clock signal generation circuit 4 (clock frequency=M/T) that employs a phase-locked-loop arrangement based on a crystal oscillator 5, and this circuit 3 generates EFM output signal by controlling the pulse duration of the EFM input signal on the basis of the recording-timing adjustment data stored in the pulse duration control circuit 2.

The EFM output signal generated by the pulse duration generation-circuit 3 is passed to a laser power control circuit 6, which, on the basis of the EFM output signal, controls the duration of a writing laser pulse to be applied from an optical pickup 8 onto the CD-WO 7.

Figure 2:
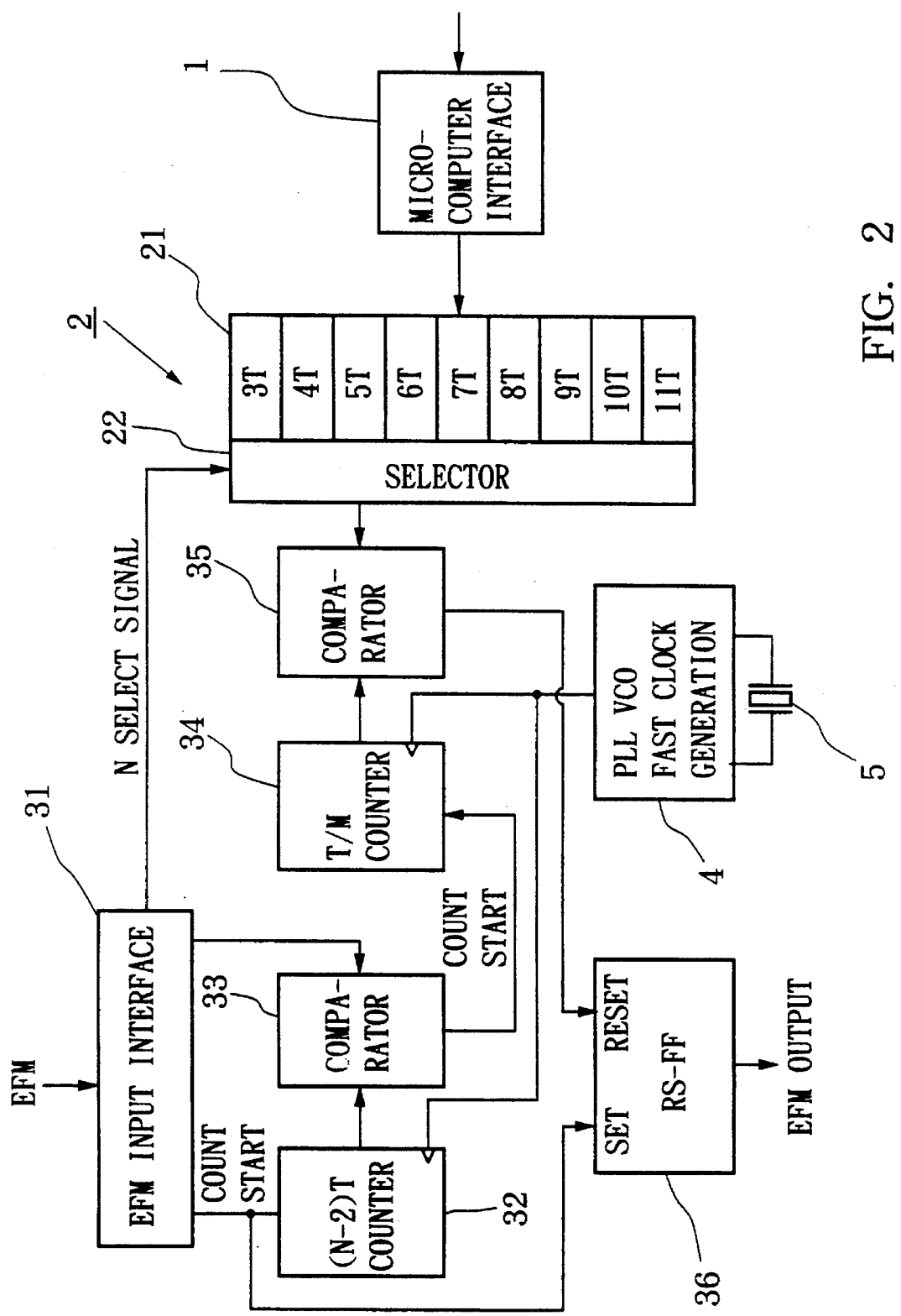
FIG. 2 is a block diagram showing in more detail the structure of the embodiment of FIG. 1.

FIG. 2 shows the structural detail of the pulse duration control circuit 2 and pulse duration generation circuit 3 of FIG. 1. The pulse duration control circuit 2 comprises a register section 21 for storing the recording-timing adjustment data which are set by the microcomputer for each output pulse that is N (N=3 to 11) times wider than the basic unit time T of the writing laser pulse, and a selector 22 for selecting one of these adjustment data for each EFM input signal. More specifically, in the illustrated embodiment, the basic unit time T is of resolution M, and the register section 21 stores, as the recording-timing adjustment data for each writing pulse duration NT, value P of (T/M)·P.

The pulse duration generation circuit 3 comprises an EFM interface 31 for receiving EFM input signal, a first pair of counter and comparator 32 and 33, a second pair of counter 34 and comparator 35, and an RS flip flop 36. The first counter 32 and comparator 33 cooperate for counting a time (N−2)T for each writing pulse NT corresponding to the EFM input signal. Here, the time value −2T serves to narrow the irradiated laser pulse duration to achieve a predetermined pit length, in consideration of the fact that the length of a pit actually recorded onto the disk by the irradiated laser pulse tends to be greater than the duration of the laser pulse. The time value −2T which eventually compensates for the expansion of the pit length with respect to the irradiated laser pulse duration has been empirically obtained, taking into account expansion amounts caused due to the laser beam diameter and heat conductance of the disk materials which have been determined by measuring the recorded pit length at a position corresponding to the center of the laser beam applied on to the CD-WO.

Once the first counter 32 has counted up the time (N−2)T, a coincidence detection signal is output by the comparator 33, upon which the second counter 34 starts counting with a period of T/M to allow the preliminary adjustment of the laser pulse duration. The comparator 35 compares a count of the counter 34 and the recording-timing adjustment data selected by the selector 22 in order to detect when the count and the adjustment data coincide with each other, and once a coincidence between the two has been detected, the comparator 35 outputs a reset signal to the flip flop 36. The flip flop 36, which is set by a count start signal provided to the counter 32 from the EFM input interface 31, is reset by the coincidence detection signal from the comparator 35 to provide a pulse-duration-controlled EFM output signal.

According to this embodiment, with respect to the writing pulse duration NT for the EFM input signal, an EFM output signal is obtained which has undergone a pulse duration control as represented by the following expression:

$$(N-2)T+(T/M)\cdot P$$

The first term (N−2)T defines a fixed time value for, as mentioned earlier, previously narrowing the laser pulse duration to achieve a necessary pit length, and this term is implemented by the first pair of counter 32 and comparator 33. On the other hand, the second term (T/M)·P defines a pulse duration amount to be adjusted in accordance with the recording-timing adjustment data set by the microcomputer, and this term is implemented by the second pair of counter 34 and comparator 35.

(T/M) in the second term is constant irrespective of the recording, i.e., writing speed selected. For example, in the case where the clock signal frequency of the clock signal generation circuit 4 employing the phase-locked-loop arrangement is 138 MHz and, the pulse control is performed with half of the clock signal resolution, the basic time T may be 231.38 nanoseconds and the resolution M per basic time T may be 64 when the recording is at a regular speed. Under the same conditions, the basic time T will be 115.69 nanoseconds and the resolution M will be 32 at the double recording speed, and the basic time T will be 57.846 nanoseconds and the resolution M will be 16 at the quadruple recording speed. This means that the time value (T/M) is 3.6 nanoseconds at every recording speed selected.

According to the above-described embodiment, the duration control of writing laser pulses to be applied onto the CD-WO 7 is performed by entirely logical operations using integrated circuitry. Since the laser pulse duration control is based on clock signal synchronously generated by the phase-locked-loop arrangement based on the crystal oscillator, no drift could occur due to temperature change etc. and necessary writing pulse durations for any selected recording speed can be set by input from the microcomputer. Further, by setting the clock of the PLL at a high speed one, the pulse duration of the laser pulse can be finely controlled. It should be appreciated that the present invention is not limited to the above-described embodiment: for instance, although the embodiment has been described above in connection with a CD-WO, the present invention may also be useful when applied to recording onto any other types of optical disks such as an optical magnetic disk.

As has been thus far described, the present invention can provide an optical disk recording device which is capable of controlling the durations of writing laser pulses without requiring many components, large space and bothersome adjustment under a minimized influence of temperature drift, and which also allows desired writing pulse durations to be set from outside.

What is claimed is:

1. An optical disk recording device for recording pits on an optical disk, the optical disk recording device comprising:

means for generating a writing laser pulse for writing a plurality of different predetermined pit lengths;

signal input means for receiving a signal to be written onto the optical disk;

clock signal generation memos employing a phase-locked-loop to generate a clock signal based on an oscillation frequency of a crystal oscillator;

a pulse duration adjusting counter driven by the clock signal so as to count a time corresponding to the signal to be written;

adjustment data setting means for setting recording-timing adjustment data for the writing laser pulse for each of the plurality of different predetermined pit lengths based on characteristics that are independent of pit length;

adjustment data storage means for storing the recording-timing adjustment data set by said adjustment data setting means;

detection means for detecting when the recording-timing adjustment data and a value counted by said pulse duration adjusting counter coincide with each other; and signal output means for, at a timing when said detection means detects a coincidence between the recording-timing adjustment data and the value counted by said pulse duration adjusting counter, outputting a write signal for controlling the duration of the writing laser pulse, said write signal being obtained by adjusting a pulse duration of said signal to be written.

2. An optical disk recording device as defined in claim 1, wherein said adjustment data setting means includes means for receiving the recording-timing adjustment data from a computer.

3. An optical disk recording device as defined in claim 1, wherein said adjustment data setting means further includes selection means for selecting from among a plurality of the recording-timing adjustment data which corresponds to said signal to be written.

4. An optical disk recording device as defined in claim 1, wherein at least said signal input means, clock signal generation means, adjustment data storage means, pulse duration adjusting counter, detection means and signal output means are implemented by integrated circuitry.

5. An optical disk recording device as defined in claim 1, wherein said signal to be written is an EFM (Eight to Fourteen) input signal and said write signal is an EFM output signal.

6. An optical disk recording device as defined in claim 1, wherein the pulse duration adjusting counter adjusts the time to be counted to a value that corresponds to each of the plurality of different predetermined pulse lengths minus a constant that compensates for expansion of the pit length due to a duration of the writing laser pulse.

7. An optical disk recording device for recording pits on an optical disk, the optical disk recording device comprising:

a laser circuit that generates a writing laser pulse for writing a plurality of different predetermined pit lengths;

a signal input circuit that receives a signal to be written onto the optical disk;

a clock signal generation circuit that uses a phase-locked-loop to generate a clock signal based on an oscillation frequency of a crystal oscillator;

a pulse duration adjusting counter driven by the clock signal so as to count a time corresponding to the signal to be written;

an adjustment data setting circuit that sets recording-timing adjustment data for the writing laser pulse for each of the plurality of different predetermined pit lengths based on characteristics that are independent of pit length;

an adjustment data storage device that stores the recording-timing adjustment data set by the adjustment data setting circuit;

a detection circuit that detects when the recording-timing adjustment data and a value counted by the pulse duration adjusting counter coincide with each other; and a signal output circuit that, at a timing when the detection circuit detects a coincidence between the recording-timing adjustment data and the value counted by the pulse duration adjusting counter, outputs a write signal that controls the duration of the writing laser pulse, such that the write signal is obtained by adjusting a pulse duration of the signal to be written.

8. An optical disk recording device as defined in claim 7, wherein the adjustment data setting circuit includes an interface that receives the recording-timing adjustment data from a computer.

9. An optical disk recording device as defined in claim 7, wherein the adjustment data setting circuit further includes a selection circuit that selects from among a plurality of the recording-timing adjustment data which corresponds to the signal to be written.

10. An optical disk recording device as defined in claim 7, wherein at least the signal input circuit, the clock signal generation circuit, the adjustment data storage device, the pulse duration adjusting counter, the detection circuit and the signal output circuit are implemented by integrated circuitry.

11. An optical disk recording device as defined in claim 7, wherein the signal to be written is an EFM (Eight to Fourteen) input signal and the write signal is an EFM output signal.

12. An optical disk recording device as defined in claim 7, wherein the pulse duration adjusting counter adjusts the time to be counted to a value that corresponds to each of the plurality of different predetermined pulse lengths minus a constant that compensates for expansion of the pit length due to a duration of the writing laser pulse.

* * * * *